United States Patent
Comparan et al.

(10) Patent No.: US 7,890,699 B2
(45) Date of Patent: Feb. 15, 2011

(54) PROCESSING UNIT INCORPORATING L1 CACHE BYPASS

(75) Inventors: Miguel Comparan, Rochester, MN (US); Eric Oliver Mejdrich, Rochester, MN (US); Adam James Muff, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/972,221

(22) Filed: Jan. 10, 2008

(65) Prior Publication Data

US 2009/0182944 A1 Jul. 16, 2009

(51) Int. Cl.
*G06F 12/00* (2006.01)

(52) U.S. Cl. .................. 711/122; 711/138; 711/146

(58) Field of Classification Search .......... 711/122
See application file for complete search history.

(56) References Cited

U.S. PATENT DOCUMENTS

| | | | | |
|---|---|---|---|---|
| 4,298,929 A | * | 11/1981 | Capozzi | 711/201 |
| 5,201,041 A | * | 4/1993 | Bohner et al. | 711/138 |
| 6,477,620 B1 | * | 11/2002 | Bauman et al. | 711/118 |
| 6,647,466 B2 | * | 11/2003 | Steely, Jr. | 711/138 |
| 2006/0112233 A1 | * | 5/2006 | Hu et al. | 711/138 |
| 2008/0059707 A1 | * | 3/2008 | Makineni et al. | 711/122 |

FOREIGN PATENT DOCUMENTS

EP 461926 A2 * 12/1991

OTHER PUBLICATIONS

Intel readies SSE 4 for 2007; Smith, Tony; PC Builder, Channel Register; Sep. 27, 2006.*
Scheme to Bypass Cache for Big, One-Time Writes IPCOM 000106475D; Knox et al.; Nov. 1, 1993.*
Scheme to Bypass Cache for Big, One Time Reads IPCOM000106494D; Knox et al.; Nov. 1, 1993.*

* cited by examiner

*Primary Examiner*—Jack A Lane
(74) *Attorney, Agent, or Firm*—Wood Herron & Evans LLP

(57) ABSTRACT

A circuit arrangement and method bypass the storage of requested data in a higher level cache of a multi-level memory architecture during the return of the requested data to a requester, while caching the requested data in a lower level cache. For certain types of data, e.g., data that is only used once and/or that is rarely modified or written back to memory, bypassing storage in a higher level cache reduces the likelihood of the requested data casting out frequently used data from the higher level cache. By caching the data in a lower level cache, however, the lower level cache can still snoop data requests and return requested data in the event the data is already cached in the lower level cache.

24 Claims, 7 Drawing Sheets

PROCESSING UNIT INCORPORATING L1 CACHE BYPASS

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

In addition, as processor architectures improve in terms of raw performance, other considerations, such as the communication costs of storing and retrieving data, become significant factors in overall performance. Data is typically organized within a memory address space that represents the addressable range of memory addresses that can be accessed by a processor. Both the instructions forming a computer program and the data operated upon by those instructions are often stored in a memory system and retrieved as necessary by a processor when executing the computer program. In order to balance cost, performance, and storage capacity, multi-level memory architectures have been developed.

Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like (e.g., L1, L2, L3, etc. caches). In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

In order to minimize cache misses, it is desirable to maintain in each cache data that is long lived and frequently used, as the more the data is accessed while in the cache, the greater the performance benefit obtained as a result of loading the data into the cache. While in some designs a performance penalty exists for initially loading data into a cache, in most designs the data is loaded into a cache in parallel with retrieving the data from a lower level memory, so there is little or no additional performance penalty beyond the penalty of retrieving the data from the lower level memory.

It has been found, however, that for certain types of data, loading the data into the cache offers little or no performance benefit, and in fact, may degrade performance by limiting the amount of space in a cache that is used for other data. As one example, in image processing applications, vertex data describing geometric objects to be placed in a scene is often stored in structures along with attributes associated with the vertices. This data may be used by high performance execution units in a processor, e.g., single instruction multiple data (SIMD) or vector execution units, to generate and place primitives in a two dimensional representation of a scene.

The vertex structures can be relatively large in size due to the vectorized nature of the data, and in conventional vertex processor implementations, the vertex structures are loaded into a register file in a vector execution unit during processing of a scene by the vertex processor. In many conventional designs, the retrieval of vertex structures into a register file is accompanied by caching of these structures in one or more levels of caches in the vertex processor. For example, in one conventional design, a vertex processor includes a relatively large, shared L2 cache and separate smaller, faster L1 data and instruction caches. Retrieval of vertex structures results in the vertex structures being cached in both the L1 data and L2 caches, as well as being stored in a register file.

However, the vertex positions can be different from frame-to-frame, and as such, many vertex structures are used only on one frame, and may only be accessed a limited number of times within that one frame. In this regard, this type of data is referred to herein as single use data. Furthermore, as noted above, the vertex structures can be relatively large, and in many cases vertex processing only requires access to vertex position data from the vertex structures, with the remainder of the data in the vertex structures going unused. The combination of these factors often results in low L1 data cache hit rates on vertex positions data. In addition, if only the vertex position is used for most computations, this means that large portions of the L1 data cache, and thus memory bandwidth, are not utilized efficiently. In addition, other data that is frequently used, e.g., local variables or program stacks, may be routinely cast out of the L1 data cache as new vertex structures are loaded into the cache.

In some conventional caching architectures, some data that is retrieved from a lower level memory is not stored in a cache. In some architectures, for example, retrieved data may bypass every cache in the hierarchy (e.g., an L1 and an L2 cache), and be stored directly in a destination such as a register, buffer or register file. In many instances, however, bypassing all caches in a hierarchy may not offer optimal performance in the event that any of the data is needed again, a high cost retrieval from the lower level memory is once again required. In other architectures, retrieved data may bypass a lower level cache (e.g., an L2 cache) in favor of storage in a higher level cache (e.g., an L1 cache). For data such as vertex structures, as described above, it is to a significant extent the relatively large size of the vertex structures as compared to the L1 cache that causes the low hit rate, so it has been found that caching single use data of this nature in the L1 cache, rather than the L2 cache, causes a greater bottleneck in performance.

Therefore, a need continues to exist in the art for a manner of improving memory access performance in multi-level memory architecture to maximize the performance of retrieving single use data.

SUMMARY OF THE INVENTION

The invention addresses these and other problems associated with the prior art by providing a circuit arrangement and method that bypass the storage of requested data in a higher level cache of a multi-level memory architecture during the return of the requested data to a requester, while caching the requested data in a lower level cache. Thus, for certain types of data, e.g., vertex data used in image processing, or other data that is only used once and/or that is rarely modified or written back to memory, bypassing storage in a higher level cache reduces the likelihood of the requested data casting out frequently used data from the higher level cache. In addition, by caching the data in a lower level cache, the lower level cache can still snoop data requests and return requested data in the event the data is already cached in the lower level cache.

Consistent with one aspect of the invention, a requester is configured to generate a request for data from a multi-level memory architecture. First and second caches are disposed in the multi-level memory architecture, with the first cache disposed at a higher level in the multi-level memory architecture than the second cache. Control logic coupled to the first and second caches is configured to, in response to the request, retrieve the requested data from the multi-level memory architecture, cause the requested data to be cached in the second cache, forward the requested data to the requester, and bypass caching of the requested data in the first cache.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention implement an L1 cache bypass technique to bypass the storage of requested data in a higher level cache of a multi-level memory architecture during the return of the requested data to a requester, while caching the requested data in a lower level cache. Thus, for certain types of data, e.g., vertex data used in image processing, or other data that is only used once and/or that is rarely modified or written back to memory, bypassing storage in a higher level cache reduces the likelihood of the requested data casting out frequently used data from the higher level cache, e.g., program stacks and/or local variables. In addition, by caching the data in a lower level cache, the lower level cache can still snoop data requests and return requested data in the event the data is already cached in the lower level cache.

Hardware and Software Environment

Figure 1:
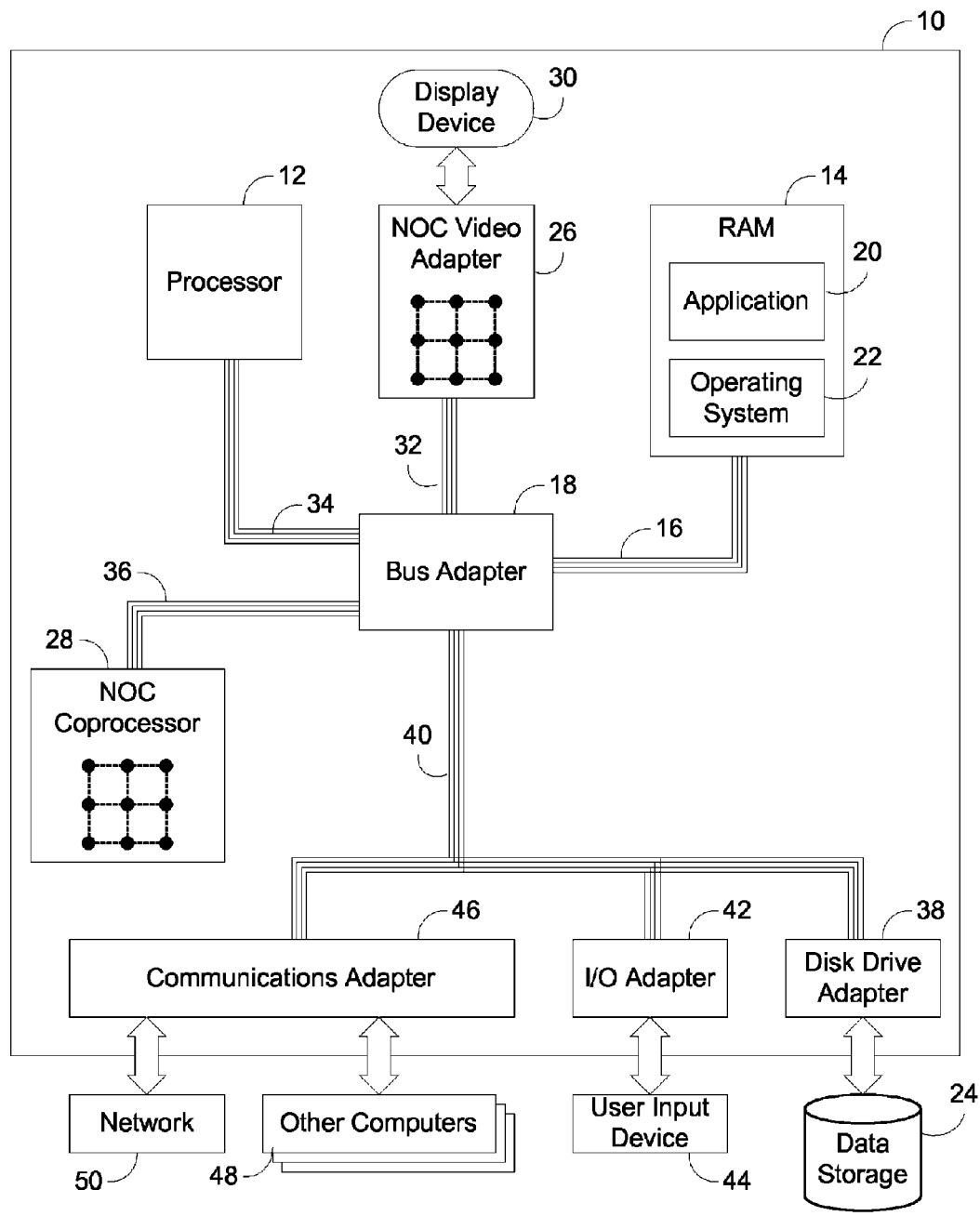
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
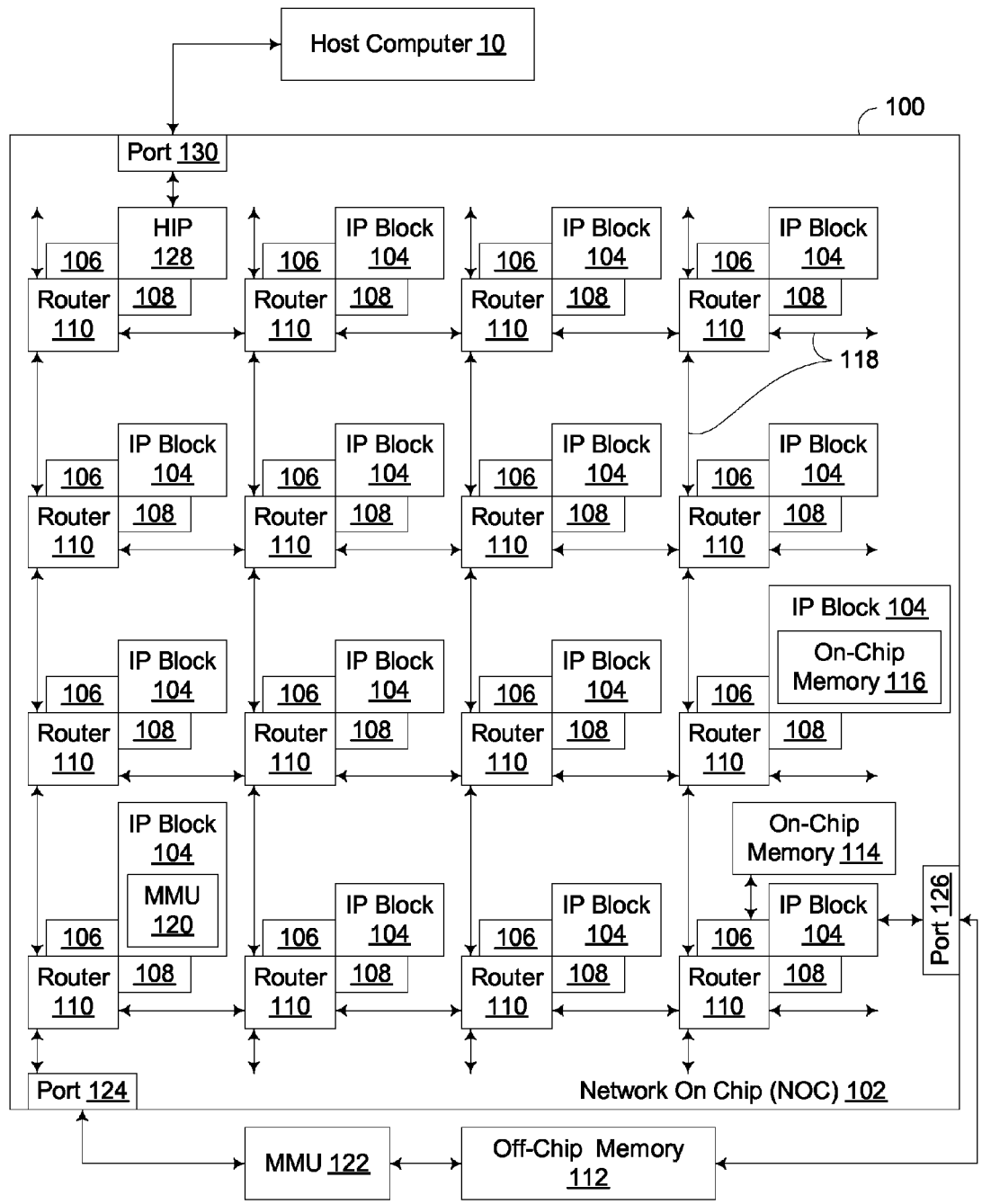
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
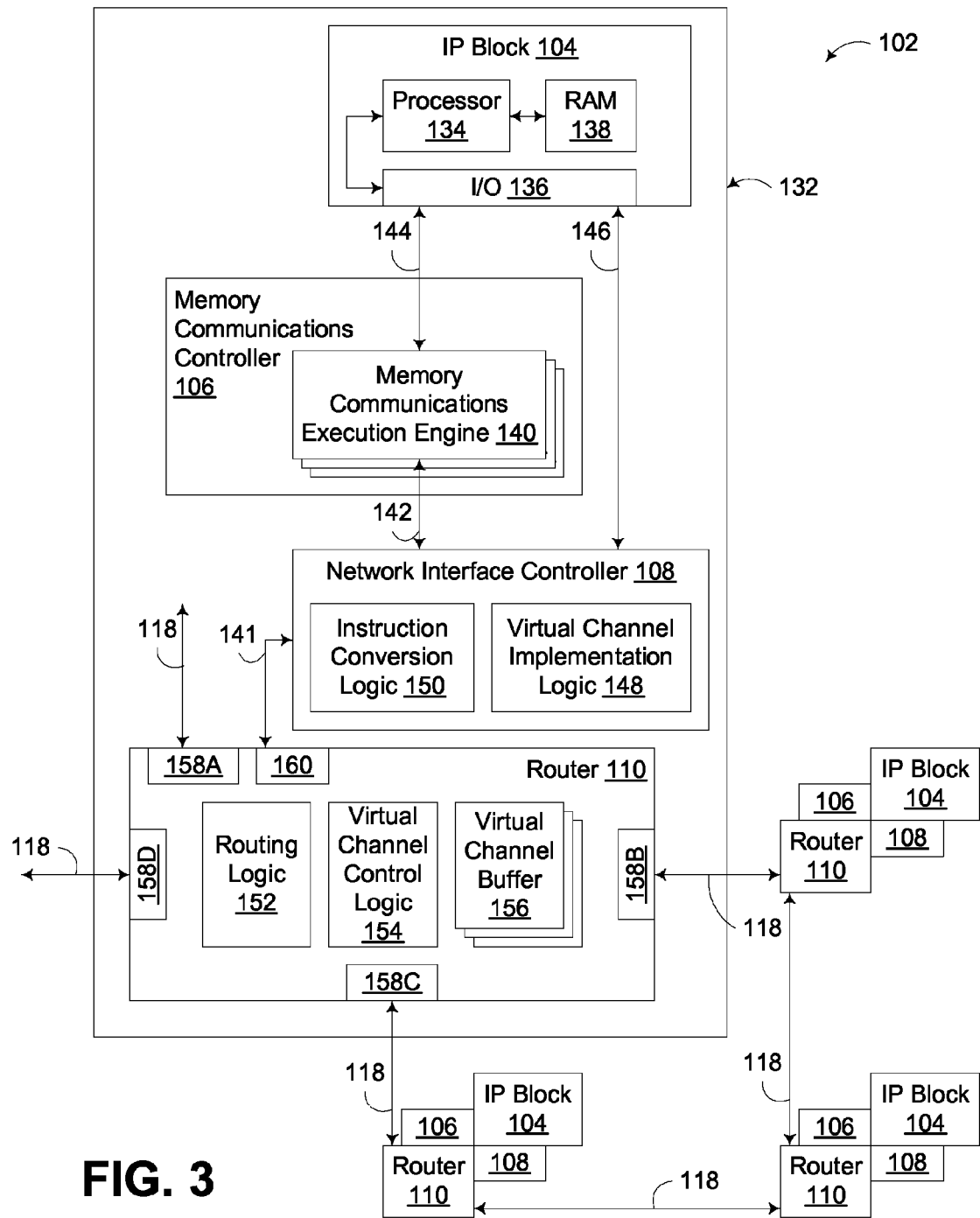
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected - and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
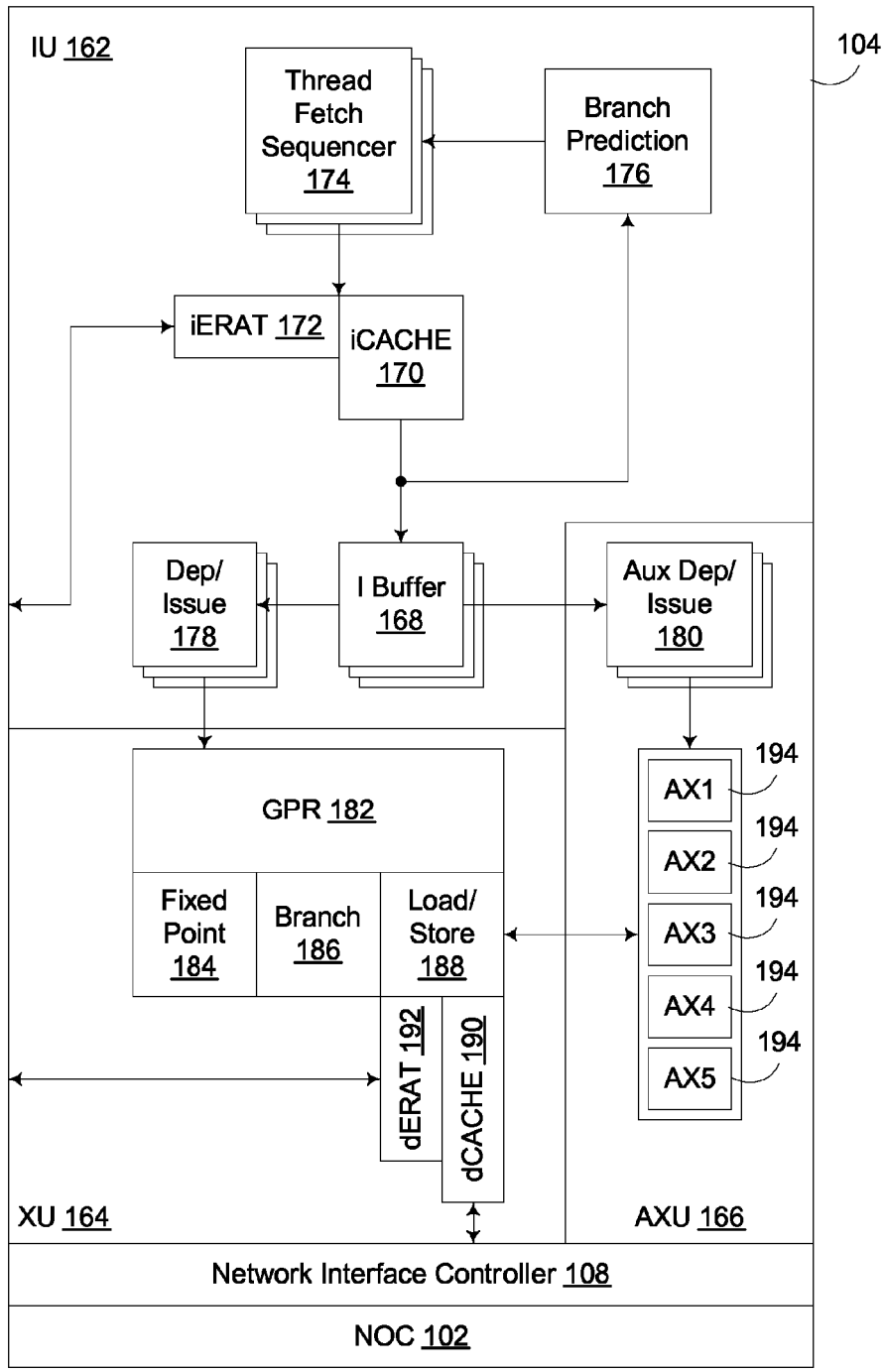
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32$b$ or 64$b$ PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

L1 Cache Bypass

Figure 5:
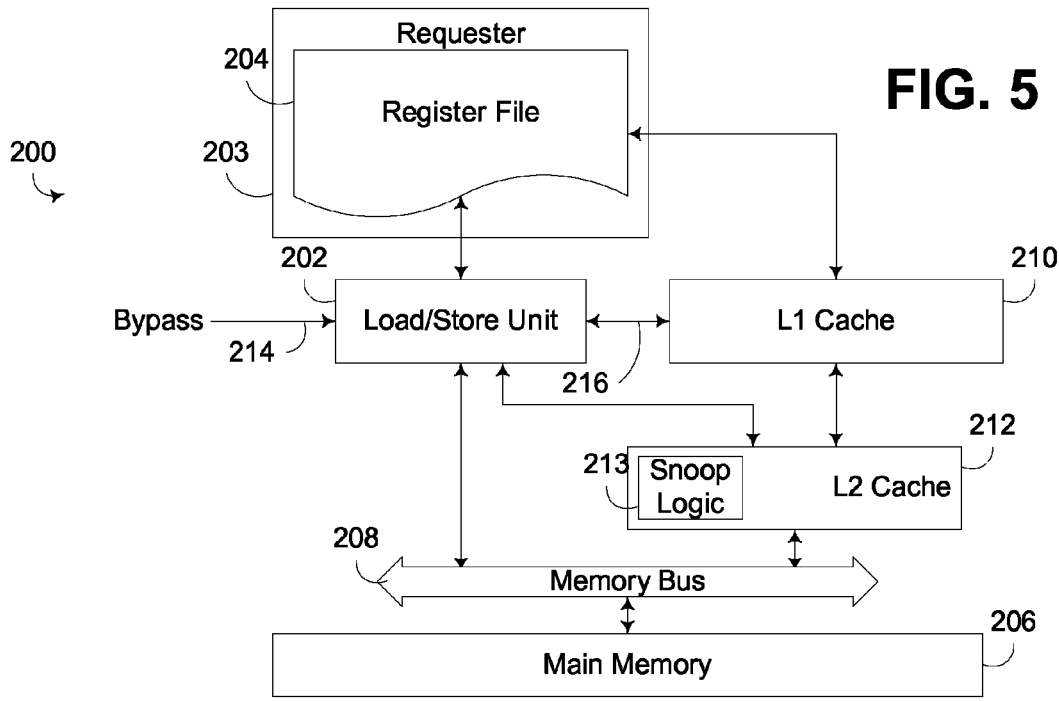
FIG. 5 is a block diagram of a circuit arrangement incorporating L1 cache bypass functionality consistent with the invention.

Turning now to FIG. 5, this figure illustrates an exemplary circuit arrangement 200 within which is implemented L1 cache bypass functionality consistent with the invention. Circuit arrangement 200 includes control logic including a load/store unit 202 coupled to a requester 203 including a register file 204, a main memory 206 over a memory bus 208, an L1 cache 210, and an L2 cache 212 with snoop logic 213.

Requester 203 may be configured as any logic within a data processing circuit capable of making requests for data from a multi-level memory architecture. In one embodiment, for example, the requester is a component of an execution unit. In other embodiments, the requester may be considered a processor, a processor core, a thread of execution in a processor, or any other logic capable of issuing memory requests to a memory. In this regard, requester 203 typically includes a register file 204 or some other destination within which data that is returned in response to a request is stored by the requester. In alternate embodiments, the destination may be a register, a buffer, or other architected storage in the requester. In addition, it will be appreciated that multiple requesters may be utilized in some embodiments, with control logic provided to process requests for data from the multiple requesters.

Main memory 206, L1 cache 210 and L2 cache 212 collectively implement a multi-level memory architecture. In a multi-level memory architecture, requests are directed to a memory address in a physical, virtual or effective memory address space, and logic is provided to load or store data in a physical device in the memory architecture without the requester having to be aware of where the most current data for the requested memory address is physically located. For example, from the standpoint of the requester, it is irrelevant whether requested data is stored in an external memory, in a local memory, in a remote memory, or any level of cache—the most current copy of the requested data is retrieved automatically from the appropriate device. Levels of memory are arranged in a multi-level memory architecture based upon how close they are to the requester, and as such, L1 cache 210 is considered to be a higher level cache than the L2 cache as it is closer to the requester from an architectural standpoint. The L1 cache, being closer to the requester, is typically smaller and faster than the L2 cache. While L1 cache bypass consistent with the invention is described herein in connection with L1 and L2 caches, it will be appreciated that the invention may be utilized in other environments to bypass a higher level cache while concurrently forwarding data to a requester and causing the storage of that data to a lower level cache, e.g., as between an L2 and L3 cache, an L1 and L3 cache, etc. In addition, it will be appreciated that the invention may be used with different types of caches, including data and/or instruction caches, fully associative caches, set associative caches, direct mapped caches, etc.

Load/store unit 202 is configured to receive requests for data from requester 203 and return the requested data to the requester, typically by forwarding the data to one or more registers in register file 204. Load/store unit 202 is coupled to main memory 206, typically over a memory bus 208, to initiate memory transactions on the memory bus and cause the main memory to return requested data, or in the event of a store request, write new data to the main memory. Load/store unit 202 is also coupled to each of L1 cache 210 and L2 cache 212, and typically forwards requests to each of the caches to enable the caches to perform directory lookups to determine whether requested data is currently cached in one of the caches. In the event of requested data being cached, the data is returned directly from the appropriate cache to the requester, thus avoiding the time required to retrieve the data from main memory. In some embodiments, requests may be issued to main memory concurrently with cache directory lookups, while in other embodiments, directory lookups may be performed prior to forwarding a request to a main memory to reduce bandwidth on the memory bus by avoiding memory transactions for data that is being returned by a local cache.

L2 cache 212 may additionally include snoop logic 213, which is used to snoop memory transactions on memory bus 208 to update the state of any cache lines stored in the L2 cache, as well as to return a requested cache line whenever the L2 cache determines that the most current copy of the cache line is stored in the L2 cache. In addition, in some embodiments, it may be desirable for L2 cache 212 to detect and cache data returned to load/store unit 202 in response to requests, and thus eliminating the need for the load/store unit to forward return data to the L2 cache. Alternative cache coherency algorithms, e.g., using a central directory, may be used in the lieu of snoop logic in other embodiments. In addition, L1 cache 210 may include snoop logic in some embodiments.

In the illustrated embodiment, load/store unit 202 is responsive to a bypass signal 214 which is used to selectively enable or disable L1 cache bypass consistent with the invention. When L1 cache bypass is disabled, returning data requested by a data request is forwarded to L1 cache 210 by load/store unit 202 over signal path 216. When L1 cache bypass is enabled, however, signal path 216 is deactivated such that returning data forwarded to register file 204 is not concurrently provided to the L1 cache.

Bypass signal 214 may be generated in a number of manners. For example, a bypass signal may be based upon the status of a mode indicator, e.g., a bit in a general purpose or special purpose register writeable by software. A bypass signal may also be based upon a mode instruction processed by the load/store unit and defined in the instruction set for the processor architecture within which the load/store unit is implemented, again providing a manner for software to control whether L1 cache bypass is used. As another alternative, the bypass signal may be generated based upon the memory request itself, e.g. based either on a type of data request (e.g., the identity of the requester, or the type of instruction that generated the data request), or based upon the address of the data being requested. In the latter instance, basing the bypass signal on the request address enables particular regions of the memory address space to automatically trigger the bypass mode of operation. Consequently, an application developer can allocate particular memory regions to data for which L1 cache bypass is best utilized, and configure the load/store unit to bypass the L1 cache whenever read requests are issued for memory addresses in the specified region(s). In some embodiments, an attribute generated during address translation may be used to trigger the bypass signal after a memory management unit has tagged specific regions of memory for L1 cache bypass. Other manners of triggering a bypass signal to enable or disable L1 cache bypass may be used in the alternative. In addition, it will be appreciated that in some embodiments of the invention, L1 cache bypass may be permanently enabled, whereby no bypass signal would be required.

Figure 6:
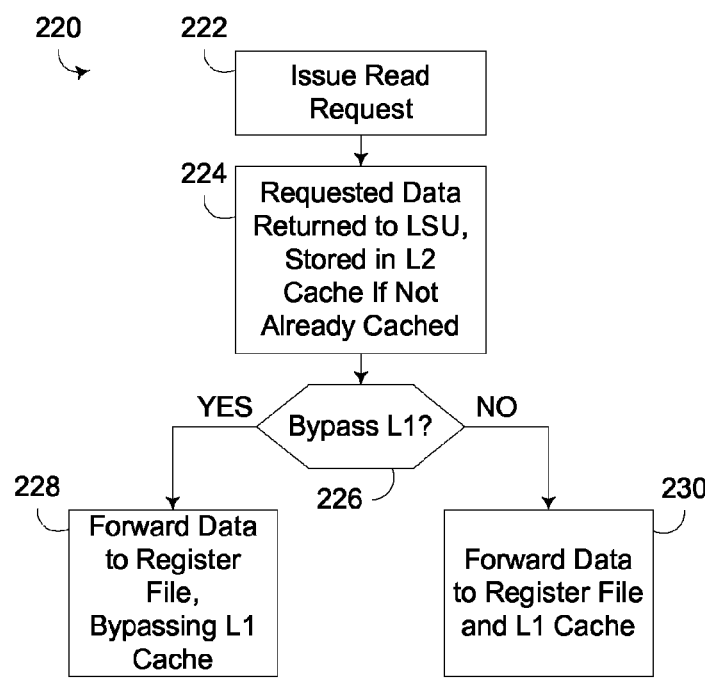
FIG. 6 is a flowchart illustrating the sequence of operations performed during retrieval of data in the circuit arrangement of FIG. 5.

FIG. 6 illustrates at 220 a sequence of operations performed by load/store unit 202 when retrieving data on behalf of a requester. As shown at block 222, in response to a data request, a read or load request is issued over memory bus 208. In some embodiments, the read request may be issued over the memory bus only if a prior lookup to the L1 cache and/or L2 cache determines the requested data is not in the cache. In the alternative, the read request may be issued simultaneously to one or both of the caches when issued on the memory bus, with the L1 or L2 cache returning the data in lieu of the memory if it is determined that the data is stored in a cache.

Next, as shown in block 224, the requested data is returned to load/store unit 202, e.g., via memory bus 208. In addition, if L2 cache 212 snoops the memory bus, the returning data may also be cached in the L2 cache in parallel with the data being returned to the load/store unit. If the return data is already cached, the return data will be sourced to the load/store unit by the L2 cache.

Next, as shown in block 226, it is determined whether L1 cache bypass is enabled. If so, as shown in block 228, the data is forwarded by the load/store unit to register file 204; however, L1 cache 210 is bypassed, and as such, the return data is not forwarded to the L1 cache. If, on the other hand, L1 cache bypass is disabled, as shown in block 230, the return data is forwarded to both the register file and L1 cache 210. In addition, in both of blocks 228 and 230, if L2 cache 212 does not snoop the memory bus and automatically cache the return data in block 224, load/store unit 202 may forward the return data to L2 cache 212 in parallel with forwarding the data to register file 204.

Figure 7:
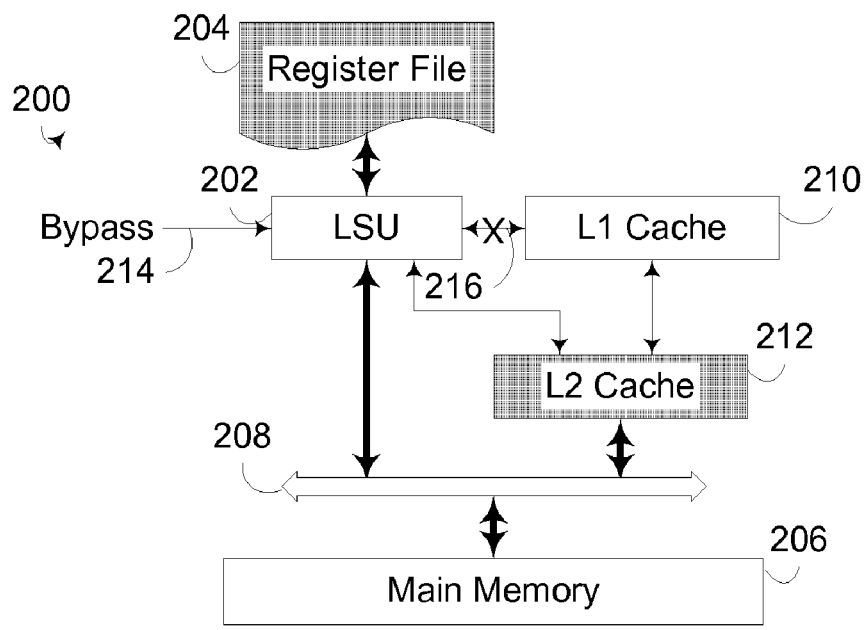
FIG. 7 is a block diagram of the circuit arrangement of FIG. 5, illustrating the retrieval of data when L1 cache bypass is enabled.
Figure 8:
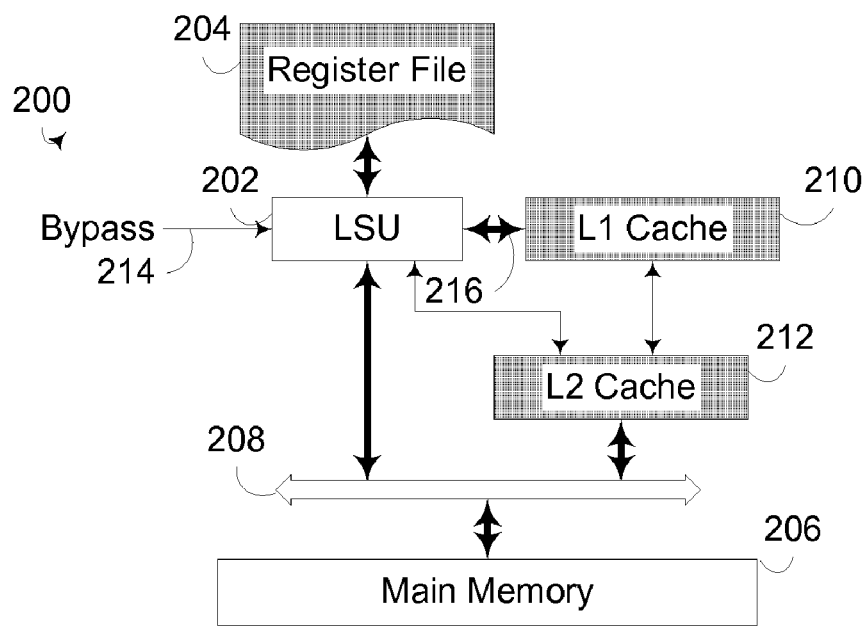
FIG. 8 is a block diagram of the circuit arrangement of FIG. 5, illustrating the retrieval of data when L1 cache bypass is disabled.

FIGS. 7 and 8 respectively illustrate the flow of data in circuit arrangement 200 when L1 cache bypass is enabled and disabled. In particular, as shown in FIG. 7, return data sourced by main memory 206 is forwarded to load/store unit 202, and concurrently L2 cache 212 snoops memory bus 208 and caches the return data. Load/store unit 202 then forwards the return data to register file 204; however, with L1 cache bypass enabled, signal path 216 is deactivated and the return data is not forwarded to L1 cache 210. On the other hand, as shown in FIG. 8, when L1 cache bypass is disabled, return data sourced by main memory 206 is forwarded to load/store unit 202, and concurrently L2 cache 212 snoops memory bus 208 and caches the return data. Load/store unit 202 then forwards the return data to register file 204, and with signal path 216 activated, concurrently forwards the return data to L1 cache 210.

Figure 9:
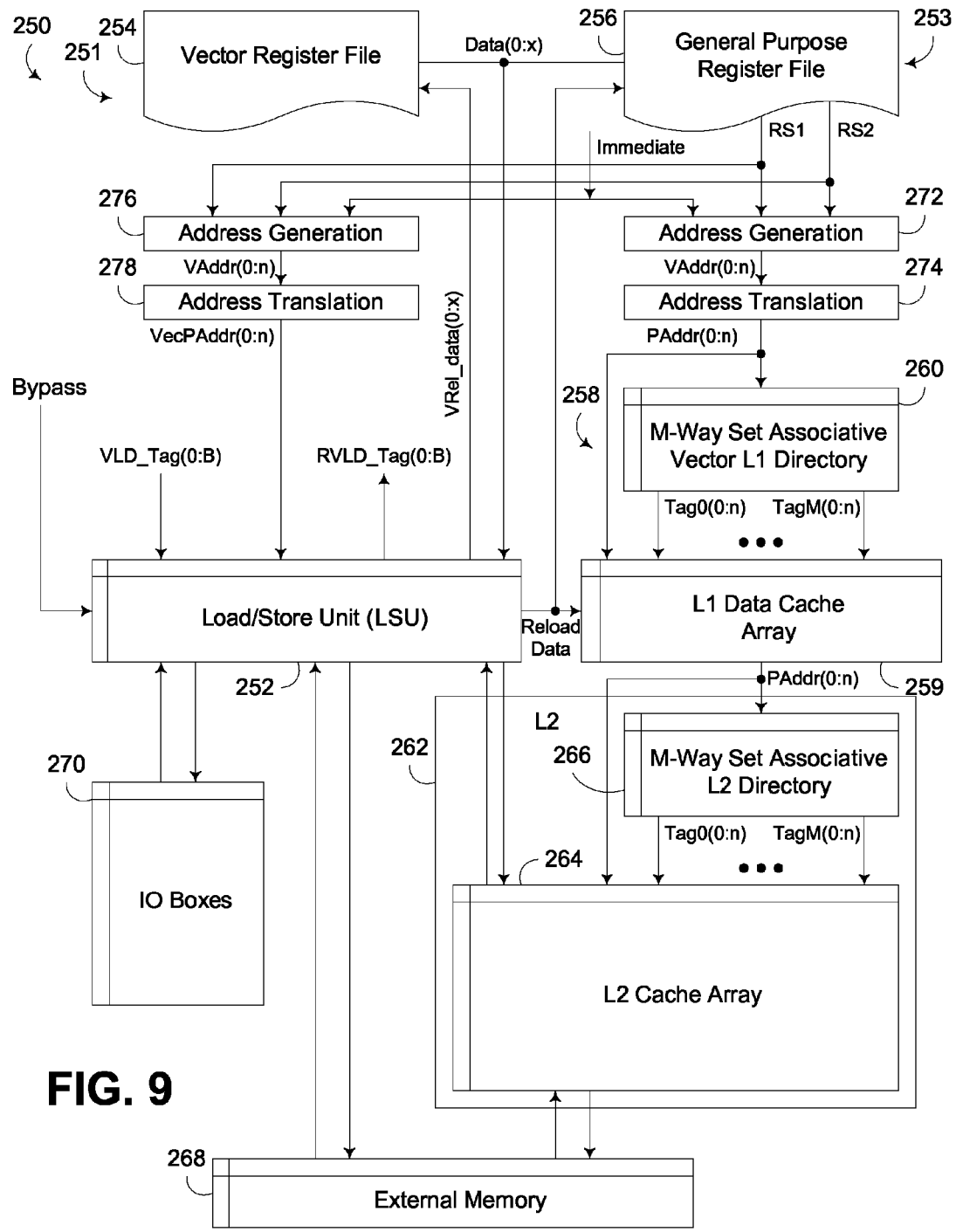
FIG. 9 of a processing unit incorporating L1 cache bypass functionality, and capable of being implemented in the IP block of FIG. 4.

Turning now to FIG. 9, this figure illustrates an exemplary processing unit 250 incorporating L1 cache bypass functionality consistent with the invention. Processing unit 250 may be implemented, for example, in an IP block such as IP block 104 from FIG. 4. In the alternative, processing unit 250 may be implemented in other processor architectures that incorporate multiple levels of caches, including single or multi-core microprocessors or microcontrollers.

In this embodiment a load/store unit 252 is used to manage memory requests for both a vector, or single instruction multiple data (SIMD), execution unit 251 and a fixed point execution unit 253. For the vector unit 251, a vector register file 254 serves as the destination for memory (data) requests, while for fixed point unit 253, a general purpose register file 256 serves as the destination. An L1 data cache 258 is illustrated in FIG. 9, and includes an L1 data cache array 259 and an M-way set associative cache directory 260 that provides M n-bit tag signals to the L1 data cache array to detect whether a hit has occurred on a requested cache line. An L2 data cache 262, including an L2 cache array 264 and M-way set associative L2 directory 266, is coupled intermediate the L1 cache and an external memory 268. Directory 266 also provides M n-bit tag signals to L2 data cache array 264 to detect whether a hit has occurred on a requested cache line.

L2 cache 262 is coupled to memory 268 via a bidirectional data bus, with one signal path originating in the L2 cache including requests and write data, and the other signal path originating the external memory including read (return) data. Similar signal paths are provided between L2 cache 262 and load/store unit 252, and well as between external memory 268 and load/store unit 252, and as such both L2 cache 262 and external memory 268 may serve as either sources for return data requested by load/store unit 252, or destinations for write data output by load/store unit 252.

L1 data cache 258, L2 cache 262 and external memory 268 collectively form a multi-level memory architecture, with L1 data cache 258 being defined at a higher level than L2 cache 262. It will also be appreciated that additional levels of memory, e.g., an L3 and/or L4 cache, may be included in some embodiments. In addition, it may be desirable in some embodiments to provide additional sources and/or destinations in a multi-level memory architecture. FIG. 9, for example, illustrates an IO boxes block 270, which represents inter-node communications with different IP blocks. In this context, inter-node communications, particularly memory-mapped communications, may be considered to be memory from the standpoint of a distributed multi-level memory architecture.

Processing unit 250 includes dual address generation and translation logic. First address generation logic 272 generates a virtual address (VAddr(0:n)) using an immediate value specified in a load/store instruction and/or a base or offset stored in a register in register file 256 (register sources RS1, RS2), and the virtual address is translated to a physical address (PAddr(0:n)) using address translation logic 274 (e.g., an ERAT). For example, address generation logic 272 may sum a base virtual address stored in one register specified in RS1 with an offset stored either in another register specified in RS2 or an immediate offset provided with the load instruction.

The physical address output by address translation logic 274 is output to L1 data cache array 259 and directory 260 to initiate a lookup of the L1 data cache. If a hit occurs, the data is returned by the array and loaded in the general purpose register file 256. Otherwise, the physical address is forwarded to L2 cache directory 266 to initiate a lookup on the L2 cache. If a hit occurs, the data is returned by the array to load/store unit 252 to reload the data back into the general purpose register file 256, as well as to L1 data cache array 259. As can be seen from the "reload data" signal path in FIG. 9, any write from the load/store unit to register file 256 likewise writes back to the L1 data cache array.

If a miss occurs in the L2 cache, a request will be issued to the memory 268 by the L2 cache.

Second address generation logic 276 operates in parallel with address generation logic 272, and outputs the virtual address VAddr(0:n) to a second address translation unit 278 (e.g., an ERAT). The output of unit 278 is a vector physical address (VecPAddr(0:n)), which is provided to the load/store unit 252, and is used to initiate a memory request to either external memory 268 or one of 10 boxes 270. Units 276 and 278 are typically only utilized for vector requests. However, in alternate configurations, only one set of address generation logic may be used for both vector and fixed point requests.

A request provided to load/store unit 252 also typically includes a B-bit tag signal (VLD_Tag(0:B) which is provided along with a load request to assist in matching up load (return) data coming from memory in response to a request. The return data, in particular, includes a return tag signal (RVLD_Tag (0:B), thereby enabling the return data to be matched with its original request. For store or write requests, a data input Data(0:x) is provided to load/store unit 252.

As noted above, return of data to general purpose register file 256, via the "reload data" signal is also output to L1 data cache 258, such that data loaded into register file 256 is also loaded into the L1 cache. However, for loads to the vector register file 254, a VREL_data(0:x) signal is provided to register file 254, but notably, this signal is not likewise provided to L1 data cache 258. Accordingly, the return of data in response to a load or read request directed to a register in vector register file 254 bypasses the L1 data cache. It will be appreciated, however, that if bypass is disabled, the return of data may also be provided to the L1 data cache over the "reload data" signal, similar to a return of data to the general purpose register file.

Load/store unit 252 operates in a similar manner to load/store unit 202 of FIG. 5, in that data requested from the multi-level memory architecture is forwarded to the requesting register file, and in the case of vector register file 254, this return of data bypasses the L1 cache. In addition, via snooping of the memory bus, L2 cache 262 loads or caches the requested data in parallel with the data being retrieved by the load/store unit, such that the requested data is stored in both the register file and the L2 cache, but not the L1 cache. In this regard, load/store unit 252 and snoop logic within L2 cache 262 collectively operate as control logic that loads requested data into the vector register file and the L2 cache, but bypasses the L1 cache. It will be appreciated, however, that control logic of this nature may be disposed exclusively in a load/store unit, or in other logic circuitry consistent with the invention.

Processing unit 250 has particular benefit in applications where data is typically only used once and/or is read but rarely if ever written out or modified. One example of such data is vertex data generated and used in a rasterization pipeline. In terms of vertex structures it is common to specify vertex attributes along with each vertex in memory. These structures are relatively large, and particularly if only vertex positions data is being used by a vector execution unit, having these large data structures loaded into a relatively small L1 data cache can flush the L1 data cache of other data that is frequently used by the processing unit, e.g., local variables, program stacks. Given also that these structures may differ from frame to frame, loading and storing these structures in the L1 data cache can cause low hit rates in the cache and consume valuable memory bandwidth.

In contrast, by bypassing the L1 data cache with loads of vertex data, the vertex data can be loaded directly into the vector register file, reducing pollution of the L1 data cache with data that would otherwise not be reused, and freeing the L1 data cache to store local variables, program stacks and other longer lived and frequently accessed data.

However, unlike conventional designs that bypass all caches when loading some types of data into a register file, processing unit 250 does load the return data into the L2 cache in concert with loading the data into the vector register file. By doing so, the L2 cache is able to snoop for relevant memory transactions, and, for example, if the L2 cache detects a store to a cached cache line, the L2 cache can invalidate the cache line and force the cache line to be reloaded if by chance the cache line needs to be reused. In addition, if the return data is refetched, and a current copy is cached in the L2 cache, the return data can be sourced by the L2 cache, avoiding the latency of requesting the data from the main memory. Due to the typical larger size of the L2 cache as compared to the L1 data cache (e.g., 2 MB v. 32 kB), the larger structures associated with vertex data typically would have much less of an adverse affect on the hit rate of the L2 cache.

Various additional modifications may be made without departing from the spirit and scope of the invention. Therefore, the invention lies in the claims hereinafter appended.

What is claimed is:

1. A circuit arrangement, comprising:
   a single instruction multiple data (SIMD) execution unit including an SIMD register file;
   a fixed point execution unit including a general purpose register file;
   a memory bus configured to be coupled to a memory;
   an L1 cache;
   an L2 cache; and
   control logic coupled to the SIMD and fixed point execution units, the memory bus and the L1 and L2 caches, the control logic configured to:
   in response to each request from the fixed point execution unit for first data, issue the request from the fixed point execution unit on the memory bus to initiate retrieval of the first data from the memory, and upon return of the first data over the memory bus, initiate storage of the first data in the general purpose register file and the L1 cache; and in response to each request from the SIMD execution unit for second data, issue the request from the SIMD execution unit on the memory bus to initiate retrieval of the second data from the memory, and upon return of the second data over the memory bus, initiate storage of the second data in the SIMD register file while bypassing the L1 cache; and wherein the L2 cache is configured to snoop the memory bus and store in the L2 cache any data requested by the control logic over the memory bus such that, in response to each request from the fixed point execution unit, the first data is stored in the fixed point execution unit, the L1 cache and the L2 cache, and in response to each request from the SIMD execution unit, the second data is stored in the SIMD execution unit and the L2 cache, but not in the L1 cache.

2. The circuit arrangement of claim 1, wherein the control logic is configured to selectively operate in a bypass mode responsive to software, wherein when the control logic is configured to operate in the bypass mode, data requested by the SIMD execution unit bypasses the L1 cache, wherein when the control logic is not configured to operate in the bypass mode, data requested by the SIMD execution unit does not bypass the L1 cache, and wherein data requested by the fixed point execution unit does not bypass the L1 cache irrespective of whether the control logic is configured to operate in the bypass mode.

3. A circuit arrangement, comprising:
   a requester configured to generate a first request for data from a multi-level memory architecture;
   first and second caches disposed in the multi-level memory architecture,
   the first cache disposed at a higher level in the multi-level memory architecture than the second cache; and
   control logic coupled to the first and second caches, the control logic configured to, in response to the first request, retrieve the requested data from the multi-level memory architecture, cause the requested data to be cached in the second cache, forward the requested data to the requester, and bypass caching of the requested data in the first cache, wherein the control logic is configured to, in response to a second request for second data, retrieve the second data from the multi-level memory architecture, cause the second data to be cached in the second cache, cause the second data to be cached in the first cache, and forward the second data to the requester, and wherein the control logic is configured to selectively operate in a bypass mode responsive to software control to selectively enable or disable caching of the second data in the first cache.

4. The circuit arrangement of claim 3, wherein the requester includes a register file, wherein the control logic is configured to forward the requested data to the requester by storing the requested data in the register file.

5. The circuit arrangement of claim 3, wherein the control logic is configured to select the bypass mode in response to a dedicated mode instruction defined in an instruction set.

6. The circuit arrangement of claim 3, wherein the control logic is configured to select the bypass mode in response to a mode indicator stored in a general purpose or special purpose register written to by software.

7. The circuit arrangement of claim 3, wherein the control logic is configured to selectively bypass caching of data in the first cache based upon a type associated with a third request.

8. The circuit arrangement of claim 3, wherein the control logic is configured to selectively bypass caching of data in the first cache based upon a memory address associated with a third request.

9. The circuit arrangement of claim 3, wherein the first cache is an L1 cache and the second cache is an L2 cache.

10. The circuit arrangement of claim 3, wherein the control logic includes a load/store unit.

11. The circuit arrangement of claim 3, wherein the control logic includes snoop logic associated with the second cache, wherein the control logic is configured to, in response to a second request from the requester that requests second data already cached in the second cache, forward the second data from the second cache to the requester, while bypassing caching of the second data in the first cache.

12. The circuit arrangement of claim 3, wherein the requester comprises a single instruction multiple data (SIMD) execution unit including an SIMD register file, and wherein the control logic is configured to forward the requested data to the requester by storing the requested data in the SIMD register file.

13. The circuit arrangement of claim 12, further comprising a fixed point execution unit including a general purpose register file, wherein the control logic is further configured to, in response to a second request from the fixed point execution unit for second data, retrieve the second data from the multi-level memory architecture, cause the second data to be cached in the second cache, cause the second data to be cached in the first cache, and forward the second data to the fixed point execution unit by storing the second data in the general purpose register file, wherein the control logic is configured such that all requests from the fixed point execution unit that miss the first cache cause data requested by such requests to be cached in the first cache, and such that all requests from the SIMD execution unit that miss the first cache cause data requested by such requests to bypass the first cache when the control logic is configured to operate in the bypass mode.

14. An integrated circuit device including the circuit arrangement of claim 3.

15. A program product comprising a recordable computer readable medium and logic definition program code resident on the computer readable medium and defining the circuit arrangement of claim 3.

16. A method of retrieving data from a multi-level memory architecture of the type including first and second caches disposed in the multi-level memory architecture, with the first cache disposed at a higher level in the multi-level memory architecture than the second cache, the method comprising, in response from a request for data from a requestor:
   retrieving the requested data from the multi-level memory architecture;
   causing the requested data to be cached in the second cache;
   forwarding the requested data to the requester; and
   bypassing caching of the requested data in the first cache;
wherein the request for data is a first request for first data, the method further comprising, in response to a second request for second data:
   retrieving the second data from the multi-level memory architecture;
   causing the second data to be cached in the second cache;
   causing the second data to be cached in the first cache; and
   forwarding the second data to the requester;
and wherein the method further comprises selecting a bypass mode responsive to software control to selectively disable caching of the second data in the first cache.

17. The method of claim 16, wherein the requester includes a register file, wherein forwarding the requested data to the requester includes storing the requested data in the register file.

18. The method of claim 16, further comprising selecting the bypass mode in response to a dedicated mode instruction defined in an instruction set.

19. The method of claim 16, further comprising selecting the bypass mode in response to a mode indicator stored in a general purpose or special purpose register written to by software.

20. The method of claim 16, further comprising selectively bypassing caching of data in the first cache based upon at least one of a type or a memory address associated with a third request.

21. The method of claim 16, wherein the first cache is an L1 cache and the second cache is an L2 cache.

22. The method of claim 16, further comprising:

snooping requests to the multi-level memory architecture with snoop logic associated with the second cache; and in response to a second request from the requester that requests second data already cached in the second cache, forwarding the second data from the second cache to the requester, while bypassing caching of the second data in the first cache.

23. The method of claim 16, wherein the requester comprises a single instruction multiple data (SIMD) execution unit including an SIMD register file, and wherein forwarding the requested data to the requester includes storing the requested data in the SIMD register file.

24. The method of claim 23, further comprising, in response to a second request from a fixed point execution unit for second data:

retrieving the second data from the multi-level memory architecture;

causing the second data to be cached in the second cache;

causing the second data to be cached in the first cache; and forwarding the second data to the fixed point execution unit by storing the second data in a general purpose register file disposed in the fixed point execution unit;

wherein the method further comprises caching in the first cache data requested by all requests from the fixed point execution unit that miss the first cache, and bypassing the first cache for all requests from the SIMD execution unit that miss the first cache when the bypass mode is selected.

* * * * *